United States Patent
Kurita

(10) Patent No.: US 9,831,616 B2
(45) Date of Patent: Nov. 28, 2017

(54) LIGHT SOURCE INTEGRATED CONNECTOR

(71) Applicant: Sumitomo Wiring Systems, Ltd., Yokkaichi, Mie (JP)

(72) Inventor: Atsushi Kurita, Mie (JP)

(73) Assignee: SUMITOMO WIRING SYSTEMS, LTD., Yokkaichi, Mie (JP)

( * ) Notice: Subject to any disclaimer, the term of this patent is extended or adjusted under 35 U.S.C. 154(b) by 345 days.

(21) Appl. No.: 14/699,231

(22) Filed: Apr. 29, 2015

(65) Prior Publication Data
US 2015/0321601 A1 Nov. 12, 2015

(30) Foreign Application Priority Data
May 7, 2014 (JP) ................................. 2014-095658

(51) Int. Cl.
*B60Q 3/51* (2017.01)
*H01R 13/717* (2006.01)
*H01R 13/74* (2006.01)

(52) U.S. Cl.
CPC .......... *H01R 13/7175* (2013.01); *B60Q 3/51* (2017.02); *H01R 13/748* (2013.01); *H01R 2201/26* (2013.01)

(58) Field of Classification Search
CPC .......... B60Q 3/0203; B60Q 3/51; B60Q 3/02; H01R 13/748; H01R 13/7175; H01R 2201/26
USPC .................................. 439/360, 490; 362/544
See application file for complete search history.

(56) References Cited

U.S. PATENT DOCUMENTS

| | | | | |
|---|---|---|---|---|
| 3,423,581 A | * | 1/1969 | Baer | B60Q 1/0011 362/506 |
| 6,329,925 B1 | * | 12/2001 | Skiver | B60R 1/12 340/425.5 |
| 6,501,387 B2 | * | 12/2002 | Skiver | B60R 1/12 250/214 AL |
| 6,877,888 B2 | * | 4/2005 | DeLine | B60Q 1/2665 362/135 |
| 7,012,543 B2 | * | 3/2006 | DeLine | B60K 35/00 248/549 |
| 2004/0165293 A1 | * | 8/2004 | Whitehead | B60R 1/04 359/871 |

(Continued)

FOREIGN PATENT DOCUMENTS

JP 2012-181984 9/2012

OTHER PUBLICATIONS

Machine Translation of JP 2012-181984.*

*Primary Examiner* — Harshad Patel
(74) *Attorney, Agent, or Firm* — Gerald E. Hespos; Michael J. Porco; Matthew T. Hespos

(57) ABSTRACT

A connector (10) includes a main body (30) having a mounting plate (31) to be mounted on a body of a vehicle and a fitting (32) that penetrates through the mounting plate (31) in a front-back direction and a display plate (50) mounted on an outer peripheral side of the connector fitting (32) and on a front side of the mounting plate (31). The display plate (50) includes a display (52), a receptacle (53) provided to be open backward from the display (52) and a light source unit (70) having a light source configured to irradiate the display (52) with light from behind and to be locked from behind by the mounting plate (31) in a state accommodated in the receptacle (53).

5 Claims, 5 Drawing Sheets

(56) References Cited

U.S. PATENT DOCUMENTS

2015/0325948 A1* 11/2015 Kurita ............... H01R 13/5227
                                                            439/206

* cited by examiner

LIGHT SOURCE INTEGRATED CONNECTOR

BACKGROUND

1. Field of the Invention

A technology disclosed by this specification relates to a light source integrated connector.

2. Description of the Related Art

Japanese Unexamined Patent Publication No. 2012-181984 discloses a charging connector for charging a battery by connecting a power feeding connector to a power receiving connector. The power receiving connector and an illumination unit are arranged side by side and each is bolted to a body of a vehicle.

The power receiving connector and the illumination unit are provided separately in the above-described charging connector. Thus, an installation space on a body side is large. Further, the power receiving connector and the illumination unit need to be bolted separately to the body. Thus, the number of bolting operations and the number of fastening components is high.

Accordingly, an object of the invention is to improve operability when mounting a light source integrated connector.

SUMMARY OF THE INVENTION

A light source integrated connector has a main body with a mounting plate to be mounted on a body of a vehicle and at least one connector fitting that penetrates through the mounting plate. A display plate is mounted on an outer peripheral side of the connector fitting and on a front side of the mounting plate. The display plate includes at least one display, a receptacle that opens away from the display and at least one light unit with at least one light source configured to irradiate the display portion with light and to be locked by the mounting plate when accommodated in the receptacle.

The display plate with the built-in light unit is mounted on the mounting plate of the main body instead of being mounted on the body of the vehicle. Thus, an installation space on a body side becomes smaller and the number of fastening operations to the body is reduced. Further, the light unit is retained utilizing the mounting plate arranged behind as a mounting structure of the light unit into the receptacle. Thus, the light unit need not be bolted to the display plate and the number of fastening components can be reduced. Further, the display plate can be miniaturized by eliminating a need for an installation space for the fastening components for fastening the light source unit to the display plate.

The mounting plate may be comprise plural protrusions that protrude toward an outer peripheral side with the connector fitting as a center, and the light unit may be locked from behind by two adjacent protrusions. The two protrusions retain the light unit more firmly retained than with the case where the light unit is retained only by one protruding portion.

The light unit may include a locking portion to be locked from the front to a locked portion provided on the receptacle. Thus, the light source unit can be held temporarily in the receptacle before being retained by the mounting plate.

The light unit may be sandwiched in the front-back direction by the display portion and the mounting plate. Thus, the light unit can be fixed firmly to the receptacle.

The light unit may include at least one light element substrate having at least one light element mounted thereon and a back lid arranged behind the light element substrate. The light element substrate may be held in contact with the display.

Accordingly, the installation space on the body side becomes smaller, the number of bolting operations to the body is reduced, the number of fastening components can be reduced and an operation of bolting the light source unit to a display plate can be eliminated.

These and other objects, features and advantages of the present invention will become more apparent upon reading of the following detailed description of preferred embodiments and accompanying drawings.

DETAILED DESCRIPTION

Figure 1:
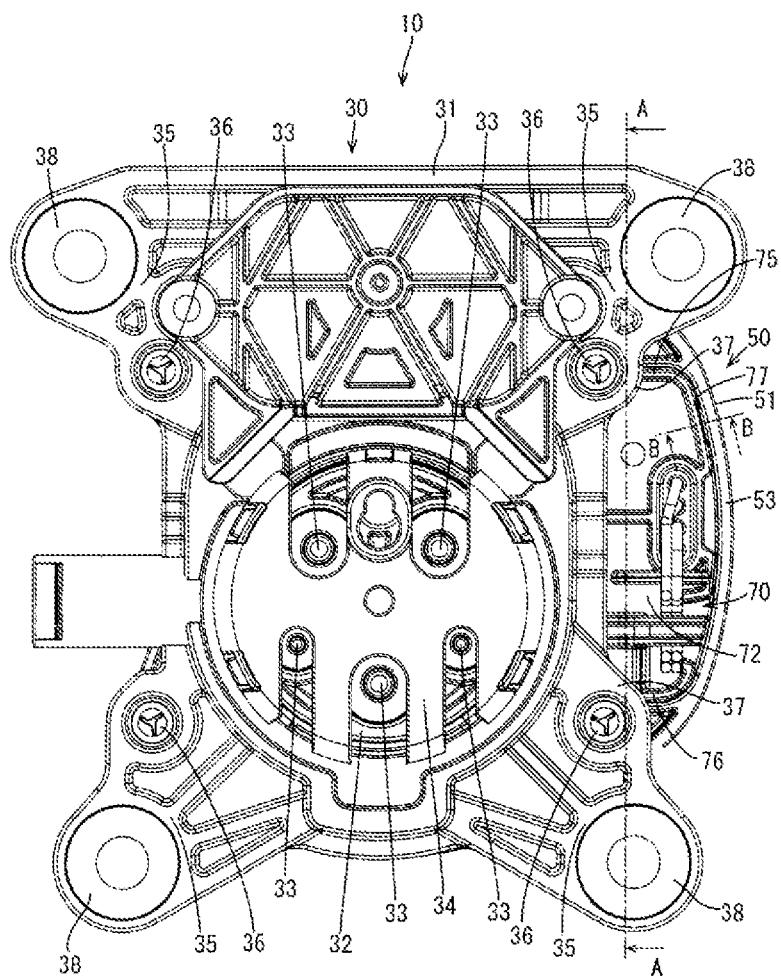
FIG. 1 is a rear view of a light source integrated connector.
Figure 2:
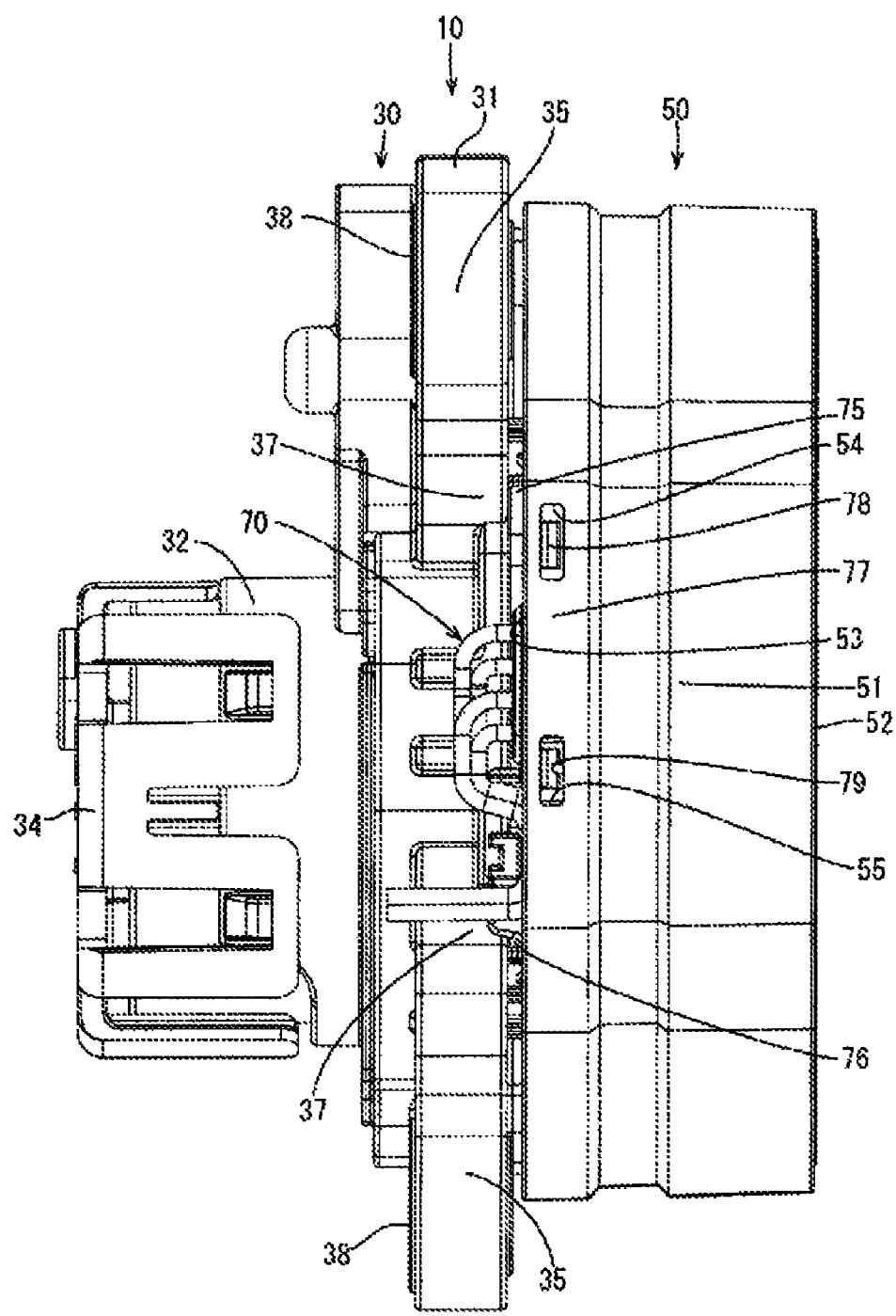
FIG. 2 is a side view of the light source integrated connector.

A connector in accordance with an embodiment of the invention is identified by the numeral 10 in FIGS. 1 and 2. The connector 10 is a light source integrated connector including a main body 30 with a mounting plate 31 to be mounted and fixed to a body of a vehicle by bolts, and a display plate 50 mounted on a front side of the mounting plate 31. In the following description of this embodiment, a front-back direction is based on a lateral direction of FIG. 2 and a right side shown is referred to as a front side.

As shown in FIG. 2, the main body 30 includes a connector fitting 32 that penetrates through the mounting plate 31 in the front-back direction. The connector fitting 32 is a substantially hollow cylinder and pin terminals 33 are accommodated inside. Further, a retainer 34 is fit onto the outer peripheral surface of a part of the connector fitting 32 projecting farther back than the mounting plate 31 from behind. The pin terminals 33 are retained by the retainer 34. On the other hand, a part of the connector fitting 32 projecting farther forward than the mounting plate 31 is fit and accommodated in an unillustrated through hole that penetrates through the display plate 50 in the front-back direction. Specifically, the display plate 50 is mounted on an outer peripheral side of the connector fitting 32 and on the front side of the mounting plate 31.

As shown in FIG. 1, the mounting plate 31 has a plurality of protrusions 35 protruding toward an outer peripheral side with the connector fitting 32 as a center. Collars 38 are fixed to tip parts of these protrusions 35. Two protrusions 35 arranged above the connector fitting 32 are formed integrally and have an inverted triangular shape as a whole. Further, in this embodiment, four protrusions 35 are provided substantially at an interval of 90° with the connector fitting 32 as a center.

The protrusion 35 is provided with a fastening seat 37 to which a bolt 36 is fastened. This fastening seat 37 protrudes from a lateral edge of the protrusion 35. The upper fastening seats 37 protrude obliquely down and the lower fastening seats 37 protrude obliquely up. The fastening seat 37 is provided in each of the four protrusions 35 and, hence, four fastening seats 37 are provided in this example. The main body 30 and the display plate 50 are fixed integrally by tightening each bolt 36 assembled with each fastening seat 37 to a corresponding unillustrated nut of the display plate 50.

Figure 3:
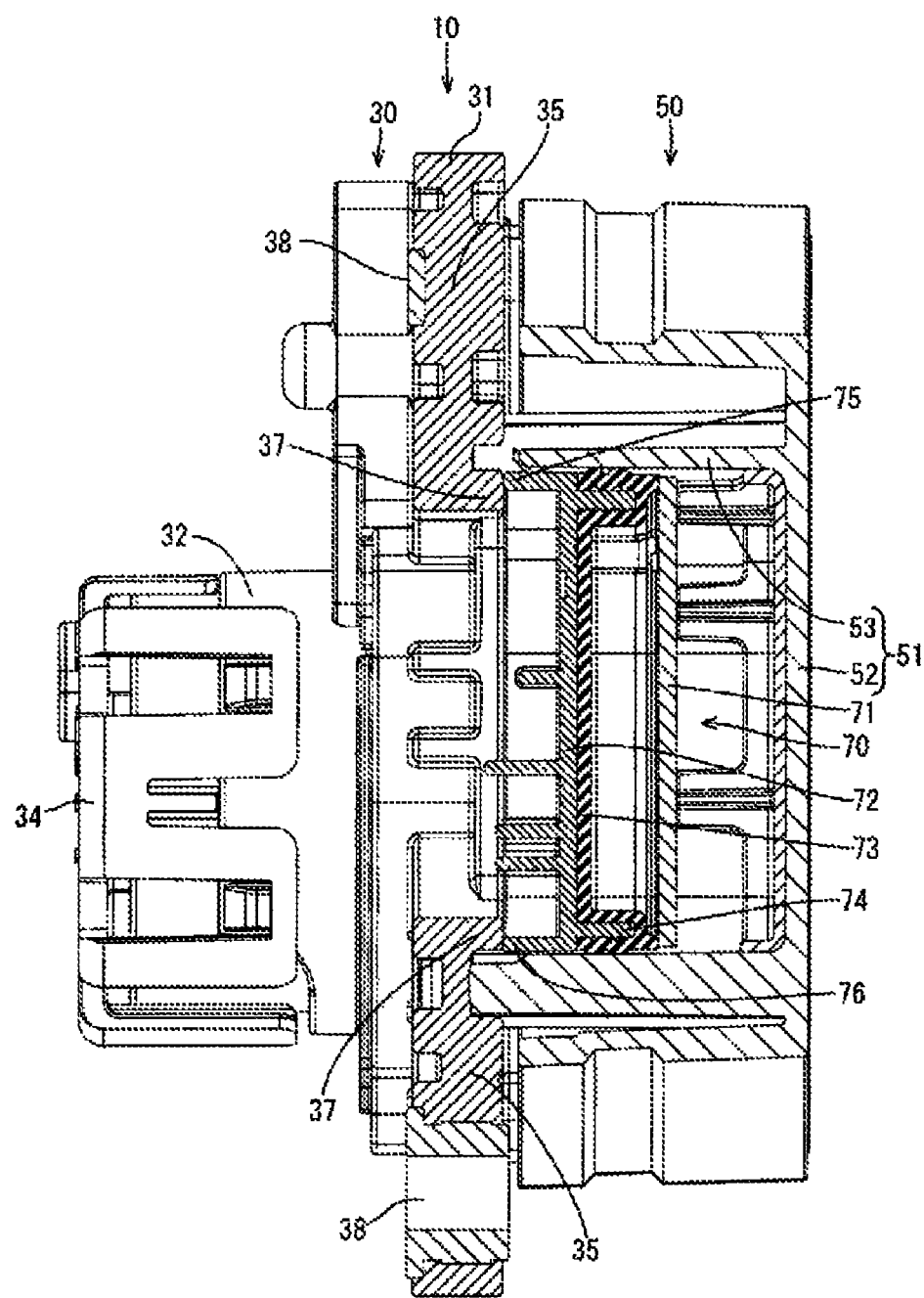
FIG. 3 is a section along A-A of FIG. 1.

The display plate 50 includes an accommodating portion 51 in which a light unit 70 using an LED as a light source is accommodated. As shown in FIG. 1, this accommodating portion 51 is arranged lateral to the connector fitting 32 to overlap upper and lower protrusions 35 in the front-back direction. As shown in FIG. 3, the accommodating portion 51 includes a display surface 52 constituting the front surface of the display plate 50 and a receptacle 53 raised back from the peripheral edge of the display plate 50. The LED of the light unit 70 irradiates the display surface 52 with light from behind so that a charge indicator and the like of the display 52 are turned on.

As shown in FIG. 3, the light source unit 70 includes an LED substrate 71 having the LED mounted thereon and a back lid 72 arranged behind the LED substrate 71 and having a seal 73 fit thereto from the front. The LED substrate 71 is held in contact with the display surface 52 from behind. Further, the seal 73 is sandwiched between the LED substrate 71 and the back lid 72. Specifically, the seal 73 is fit to a mounting wall 74 circumferentially provided on the front surface of the back lid 72 from front. In this way, the seal 73 seals a clearance between the inner peripheral surface of the receptacle 53 and the outer peripheral surface of the mounting wall 74 in a liquid-tight manner.

Figure 4:
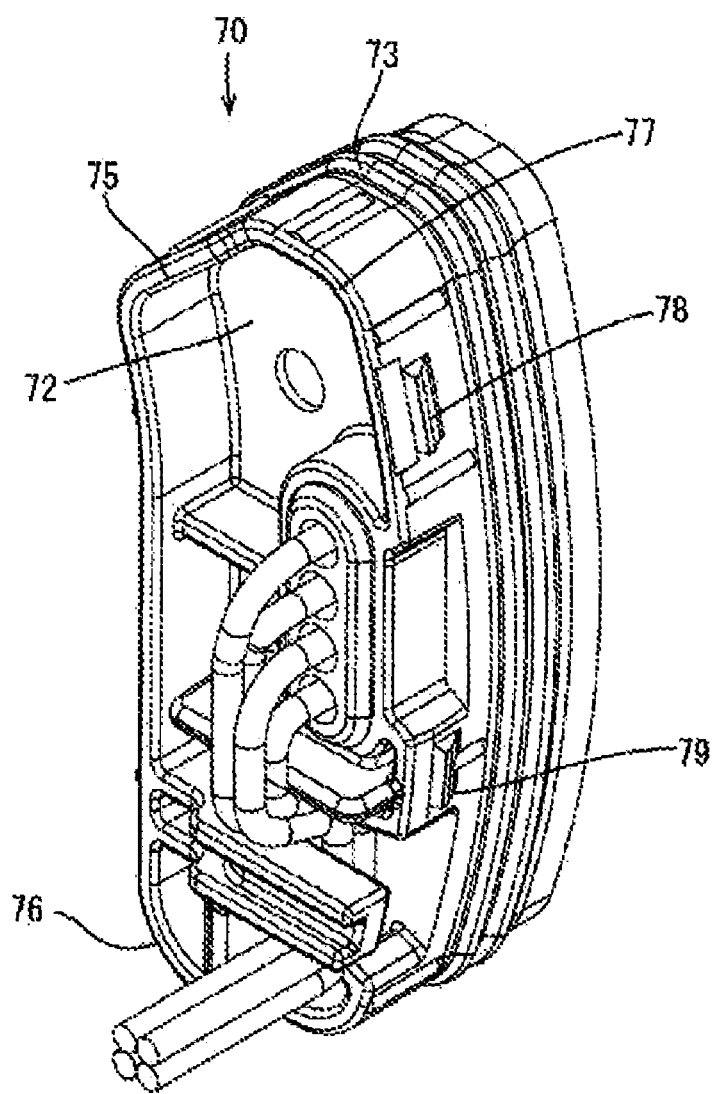
FIG. 4 is a perspective view of a light source unit.

On the other hand, upper and lower abutting portions 75, 76 are provided on the rear surface of the back lid 72. The abutting portions 75, 76 project back from the peripheral edge of the back lid 72 and are arranged along the inner peripheral surface of the receptacle 53. As shown in FIG. 4, a peripheral wall 77 connected to the upper abutting portion 75 is lower than this abutting portion 75, and upper and lower locking protrusions 78, 79 are provided on the outer peripheral surface of the peripheral wall 77.

Figure 5:
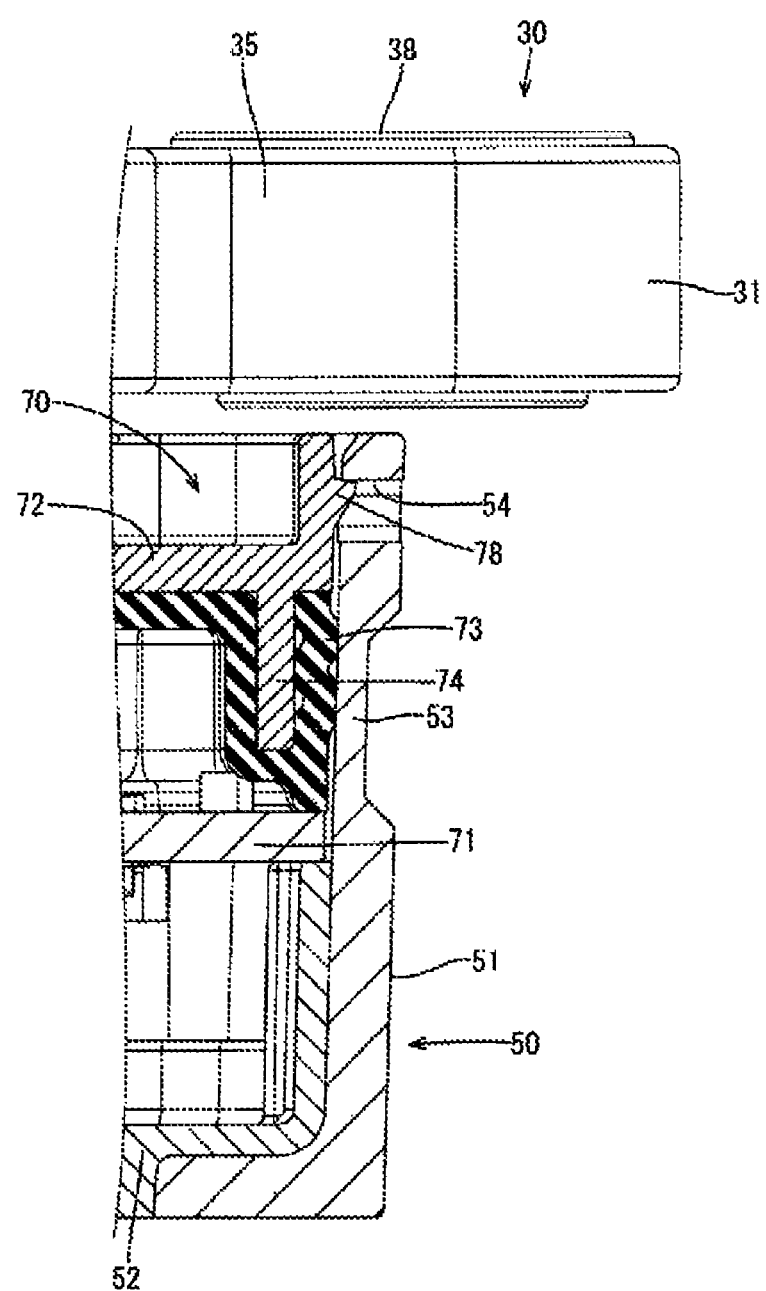
FIG. 5 is a section along B-B of FIG. 1.

On the other hand, as shown in FIG. 5, a locking hole 54 penetrates through the receptacle 53 in a plate thickness direction and the upper locking protrusion 78 is fit therein from an inner side. Similarly, as shown in FIG. 2, a locking hole 55 is provided on the inner peripheral surface of the receptacle 53 and the lower locking protrusion 79 is fit therein from the front and the inner side.

In a state where the respective locking protrusions 78, 79 are fit and locked to the corresponding locking holes 54, 55, the light source unit 70 is held accommodated in the receptacle 53. Further, as shown in FIG. 3, a upper and lower fastening seats 37 of the mounting plate 31 are held in contact with the rear ends of the upper and lower abutting portions 75, 76 of the light source unit 70 from behind. This causes the light source unit 70 to be sandwiched in the front-back direction by the display 52 and the mounting plate 31. In this way, the light source unit 70 is fixed without backlash in the receptacle 53.

The light source unit 70 is mounted into the receptacle 53 of the display plate 50 from behind. Then, the upper locking protrusion 78 of the light source unit 70 is fit into and locked to the upper locking hole 54 of the receptacle 53 from the front and the lower locking protrusion 79 is fit into and locked to the lower locking hole 55 from the front. This causes the light source unit 70 to be held temporarily in the receptacle 53. Subsequently, the display plate 50 is mounted on the main body 30 from the front. Then, the display plate 50 is fit on an outer peripheral side of the connector fitting portion 32 and arranged on the front side of the mounting plate 31.

Then, each bolt 36 is inserted into a bolt insertion hole of each fastening seat 37 and tightened into the nut on the side of the display plate 50. In this way, the display plate 50 is fixed to the main body 30 and, as shown in FIG. 3, the upper abutting portion 75 contacts the upper fastening seat 37 and the lower abutting portion 76 contacts the lower fastening seat 37. Thus, the light source unit 70 is fixed to the receptacle 53 in a state sandwiched in the front-back direction by the mounting plate 31 and the display plate 50 and retained by the mounting plate 31. In this way, the connector 10 is constructed. Thereafter, the bolts are inserted into the collars 38 at four positions and tightened into screw holes on the body side to mount the connector 10 on the body of the vehicle.

As just described, there are only four fastening positions on the body side and the bolting operation to the body only has to be performed a small number of times. Further, an installation space on the body side can be small. In addition, since the light unit 70 is retained utilizing the fastening seats 37 of the mounting plate 31, it is not necessary to provide the main body 30 with a separate retaining portion for the light source unit 70 and the main body 30 can be miniaturized. In addition, the light unit 70 needs not be bolted to the display plate 50. Therefore both the display plate 50 and the light unit 70 can be miniaturized.

As described above, the display plate 50 with the built-in light unit 70 is mounted on the mounting plate 31 of the main body 30 instead of being mounted on the body of the vehicle. Thus, the installation space on the body side becomes smaller and the number of fastening operations to the body is reduced. Further, the light unit 70 is retained utilizing the mounting plate 31 arranged behind as a mounting structure of the light unit 70 into the receptacle 53. Thus, the light unit 70 need not be bolted to the display plate 50 and the number of fastening components can be reduced. Further, the display plate 50 can be miniaturized by eliminating a need for an installation space for the fastening components to fasten the light unit 70 to the display plate 50.

The mounting plate 31 may be composed of the protrusions 35 that protrude toward the outer peripheral side with the connector fitting 32 as a center and the light unit 70 may be locked from behind by two adjacent protrusions 35. Accordingly, the light unit 70 can be retained by the two protrusions 35. Therefore the light unit 70 can be retained firmly as compared with the case where the light unit 70 is retained by only one protrusion 35.

The light unit 70 may include a locking portion configured to lock a locked portion on the receptacle 53 from the front. Thus, by locking the locking portion to the locked portion, the light unit 70 can be held temporarily in the receptacle 53 before being retained by the mounting plate 31.

The light source unit 70 may be sandwiched in the front-back direction by the display portion 52 and the mounting plate 31. According to this configuration, the light source unit 70 can be fixed firmly to the receptacle 53.

The technology disclosed by this specification is not limited to the above described and illustrated embodiment. For example, the following various modes are also included.

Although the LED is illustrated as the light source in the above embodiment, a halogen lamp, a laser or any other light source may be used as the light source.

Although the mounting plate 31 has plural protrusions 35 in the above embodiment, it may be composed of or comprise a single plate.

The locking holes 54, 55 are illustrated as the locked portion in the above embodiment, but a projection may be provided as the locked portion.

The light source unit 70 is sandwiched in the front-back direction by the display portion 52 and the mounting plate 31 in the above embodiment. However, it may be retained without being sandwiched.

REFERENCE SIGNS

10 . . . connector
30 . . . main body
31 . . . mounting plate
32 . . . fitting portion
35 . . . protrusion
50 . . . display plate
51 . . . accommodating portion
52 . . . display
53 . . . receptacle
54 . . . upper locking hole (locked portion)
55 . . . lower locking hole (locked portion)
70 . . . light source unit
71 . . . LED substrate (light source)
75 . . . upper abutting portion
76 . . . lower abutting portion
78 . . . upper locking protrusion (locking portion)
79 . . . lower locking protrusion (locking portion)

What is claimed is:

1. A light source integrated connector, comprising:
a connector main body including a mounting plate having opposite front and rear sides, the rear side to be mounted on a body of a vehicle;
at least one connector fitting penetrating through the mounting plate from the rear side to the front side and configured to accommodate terminals therein;
a display plate mounted on an outer peripheral side of the connector fitting and on the front side of the mounting plate, the display plate including at least one display portion on a front side of the display plate, and a receptacle open rearward and away from the display portion; and
at least one light unit accommodated in the receptacle and locked to the front side of the mounting plate, the at least one light unit having at least one light source configured to irradiate the display portion with light.

2. The light source integrated connector of claim 1, wherein the mounting plate comprises a plurality of protrusions protruding toward an outer peripheral side substantially with the connector fitting portion as a center, and the light unit is locked from behind by at least two adjacent protruding portions.

3. The light source integrated connector of claim 1, wherein the light unit includes at least one locking portion to be locked from the front to at least one locked portion on the receptacle.

4. The light source integrated connector of claim 1, wherein the light unit is sandwiched in the front-back direction by the display portion and the mounting plate.

5. The light source integrated connector of claim 1, wherein the light source unit includes at least one light element substrate having at least one light element mounted thereon and a back lid arranged behind the light element substrate, and wherein the light element substrate is held in contact with the display portion.

* * * * *